United States Patent [19]

Auschra et al.

[11] Patent Number: 5,597,871
[45] Date of Patent: Jan. 28, 1997

[54] COMB POLYMERS

[75] Inventors: Clemens Auschra, Mainz; Juergen Omeis, Bickenbach; Horst Pennewiss, Darmstadt, all of Germany

[73] Assignee: Roehm GmbH Chemische Fabrik, Darmstadt, Germany

[21] Appl. No.: 523,518

[22] Filed: Sep. 1, 1995

[30] Foreign Application Priority Data

Sep. 2, 1994 [DE] Germany ............. 44 31 302.0

[51] Int. Cl.$^6$ .................................. C08F 290/04
[52] U.S. Cl. .................. 525/309; 525/279; 525/296; 525/302
[58] Field of Search .................... 525/279, 309, 525/296, 302

[56] References Cited

U.S. PATENT DOCUMENTS

| 3,862,102 | 1/1975 | Mikovich | 260/94.7 R |
| 5,075,389 | 12/1991 | Kennedy | 525/353 |

FOREIGN PATENT DOCUMENTS 03179004  8/1991  Japan .

OTHER PUBLICATIONS

Acta Polym., vo. 45, No. 6, pp. 413–418.

*Primary Examiner*—Vasu S. Jagannathan
*Attorney, Agent, or Firm*—Oblon, Spivak, McClelland, Maier & Neustadt, P.C.

[57] ABSTRACT

The present invention relates to comb polymers KP, produced from macromonomers of formula (I)

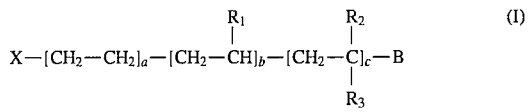

where X represents a group which comes from the initiator system, preferably an alkyl group with 1–50 C atoms; R1 represents an alkyl group with 1–18 C atoms, preferably 1–10 C atoms, particularly preferably 1–4 C atoms; R2 and R3 each represent an alkyl group with 1–8 C atoms; and B represents a terminal alkene group with at least 2 and not more than 12 C atoms; wherewith the compound of formula (I) is converted, by means which are per se known, to a compound of formula (II) which contains an active hydrogen substituent in the terminal position:

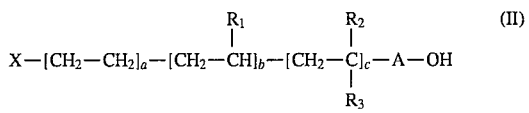

where X, R1, R2, a, b, and c are as defined above, and a represents the group B modified by introduction of the active hydrogen function; wherewith the compound of formula (II) in turn is acylated to a macromonomer of formula (IV) by a reagent MR which introduces the (meth)acryloyl group:

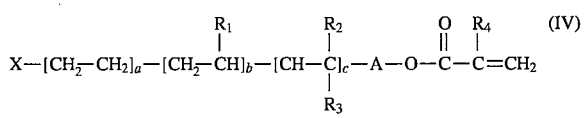

where X, R1, R2, R3, A, a, b, and c are as defined above, and R4 represents hydrogen or methyl; and the macromonomers of formula (IV) thus obtained are converted to the comb polymers KP by radical polymerization with monomers M chosen from the group comprised of: (meth)acrylic acids of $C_1$–$C_{28}$-alkanols, functionalized radically polymerizable monomers, vinyl esters of fatty acids and vinylaromatic monomers.

16 Claims, 1 Drawing Sheet

COMB POLYMERS

BACKGROUND OF THE INVENTION

1. Field of the Invention

The invention relates to comb polymers and a method of manufacturing same from macromonomers having a terminal double bond.

2. Discussion of the Prior Art

In the prior art, anionic oligomerization is recommended for synthesizing functional oligomers, particularly telechic oligomers with a narrow molecular weight distribution. In particular, with respect to monomers such as styrene, 1,3-butadiene, and isoprene, the literature describes manufacture of alpha,omega-bifunctional oligomers by initiation with bifunctional initiators and termination with suitable reagents. Macromonomers are suitable for a number of interesting applications, such as use as starting materials for the manufacture of comb polymers. (See Houben and Weyl, "Methoden der Organischen Chemie", 4th Ed., Vol. E20, pub. Georg Thieme, pp. 647–648, 1166–1167 (1987); Rempp, P. F., and Franta, E., *Adv. Polym. Sci.*, 58, 1–3 (1984); and Mark, H. F., et al., "Encyclopedia of polymer science and technology", Vol. 9, pub. J. Wiley, pp. 195–204 (1987)). The unpublished Eur. Pat. App. 94-105,648.3 discloses the manufacture of comb polymers by radical copolymerization of olefin-copolymer macromonomers of formula

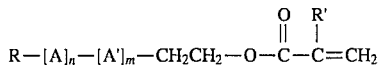

where

R' represents hydrogen or methyl;

R represents the organic group in an organolithium compound;

[A] represents a segment formed by 1,4-addition of butadiene, optionally substituted with an alkyl group with 1–6 C atoms;

[A'] represents a segment formed by vinyl addition of butadiene, optionally substituted with an alkyl group with 1–6 C atoms; and n and m each represent an integer from 10 to 3000; with (meth)acrylic acid esters of $C_1$–$C_{26}$-alkanols.

wherein, R is contributed from the organolithium catalyst used in the anionic polymerization. Preferably R is a butyl or phenyl group.

Comb polymers comprised of a polyalkyl (meth)acrylate main chain and high molecular weight hydrocarbon side chains have extraordinary behavior in solutions, in addition to other technically interesting properties. The properties of such comb polymers suit them for use as viscosity index improving agents (V.I.-improvers) in the lubricants sector, as described, e.g., in the above-cited Eur. Pat. App. 94-105,648.3. (See Ullmann's Encyclopedia of Industrial Chemistry, 5th Ed., Vol. A 15, pub. VCH, pp. 448–449 (1990)).

The macromonomers used according to the cited Eur. Pat. App. as starting materials for the comb polymers are produced on the basis of dienes. This route of synthesis comprises a hydrogenation step in addition to the polymerization and functionalization. It would be preferable to use a direct method of manufacturing saturated olefinic polymers having a reactive terminal group. Devising such a method is the underlying problem of the invention. In solving the problem, one advantageously exploits catalysis with metallocene catalysts (see Muehlhaupt, R., *Nachrichten aus Chemie und Technik*, 41, 1341 (1993)).

DESCRIPTION OF THE INVENTION

Accordingly, the invention relates to comb polymers KP produced from macromonomers of formula (I):

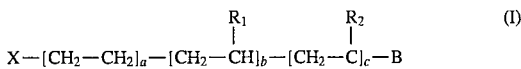

where

X represents a group contributed from the initiator system, and which is preferably an alkyl group with 1–50 C atoms;

$R_1$ represents an alkyl group with 1–18 C atoms, preferably 1–10 C atoms, particularly preferably 1–4 C atoms;

$R_2$ and $R_3$ each represent an alkyl group with 1–8 C atoms; and

B represents a terminal alkene group with at least 2 and not more than 12 C atoms, which group is preferably chosen from the group comprising:

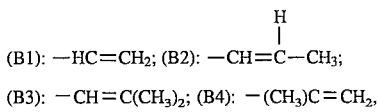

with the following provisions:

(1) If the parameter c represents a molar percentage of greater than 0 mol %, the parameter a represents a molar percentage of zero mol %, of the monomers in the macromonomer of formula (I);

(2) The sum of the parameters (a+b) equals 100 mol % of the monomers in the macromonomer of formula (I), wherewith a should be at most 80 mol %, or (3) The sum of b and c should equal 100 mol % of the monomers in the macromonomer of formula (I); and (4) If a is zero, R1 becomes R1', which represents an alkyl group with 2–18, preferably 2–10, particularly preferably 2–4 C atoms;

wherewith the compound of formula (I) is converted, by means which are per se known, to a compound of formula (II) which contains an active hydrogen substituent in the terminal position:

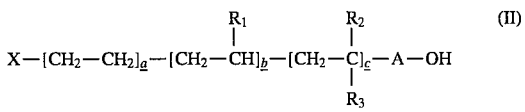

where

X, R1, R2, R3, a, b, and c are as defined above, and

A represents the group B modified by introduction of the active hydrogen function;

wherewith the compound of formula (II) in turn is acylated to a macromonomer of formula (IV) by a reagent MR which introduces the (meth)acryloyl group:

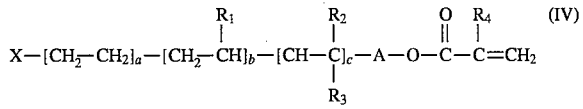

where

X, R1, R2, R3, A, a, b, and c are as defined above, and

R4 represents hydrogen or methyl; and the macromonomers of formula (IV) thus obtained are converted to the comb polymer KP by radical polymerization with monomers M selected from the group consisting of:

(meth)acrylic acids of $C_1$–$C_{28}$-alkanols, functionalized, radically polymerizable monomers, vinyl esters of fatty acids, and vinylaromatic monomers.

The macromonomers of formula (I) are saturated except for the terminal unsaturation.

DETAILED DESCRIPTION OF THE INVENTION

The invention particularly relates to comb polymers KP manufactured starting with the macromonomers of formula (I), which macromonomers are reacted with a hydroxyl-group-transferring reagent of formula (III)

$$Q-R-OH \qquad (III)$$

where

Q represents a function which adds to the double bond in B in formula (I), and

R represents an inert organic group with 2–16 C atoms; resulting in compounds of formula (II-A)

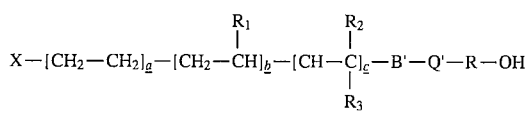

where

X, R1, R2, R3, a, b, and c are as defined above, and

—B'—Q'— represents the moiety formed by addition of Q to B across the double bond;

and the compounds of formula (II-A) are acylated to macromonomers of formula (IV-A) by a reagent MR which introduces the (meth)acryloyl group:

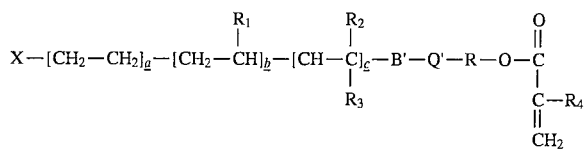

where

X, R1, R2, R3, R4, a, b, c, B', Q', and R are as defined above;

and, further, the macromonomers of formula (IV) thus obtained are converted to the comb polymers KP by radical polymerization with monomers M selected from the group consisting of:

(meth)acrylic acids of $C_1$–$C_{28}$-alkanols, functionalized monomers, vinyl esters of fatty acids, and vinylaromatic monomers, such as styrene and $C_1$–$C_4$-alkylstyrenes.

In general, the weight ratio of macromonomer IV to monomer M is in the range 2:98 to 100:0. As a rule the proportion of (meth)acrylic acid esters in the monomer M is in the range 60–100 wt. %, preferably 75–100 wt. %, particularly preferably 95–100 wt. %.

Preferably the monomers M are selected from the group comprised of:

(meth)acrylic acid derivatives of formula (V)

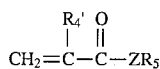

where

R4' represents hydrogen or methyl,

R5 represents an alkyl group with 1–24 catoms, particularly 4–24 C atoms, and

Z represents oxygen or a group NR7 where

R7 represents hydrogen or an alkyl group with 1–6 C atoms;

functionalized monomers of formula (VI) in the amount of 0–75 wt. %, preferably 0.5–50 wt. %, particularly preferably 2–15 wt. %, based on the total weight of the monomers M

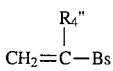

where

R4" represents hydrogen or methyl, and

Bs represents an (inert) heterocyclic 5- or 6-membered ring or a group

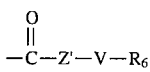

where

Z' represents oxygen or a group —NR7', and

V represents a hydrocarbon bridge, optionally alkylated, having a total of 2–50 C atoms which may be interrupted by oxygen bridges, the number of which O-bridges is preferably in the range 2 to (q-1), where q is the number of C-bridge atoms in the chain, and R6 represents —OR7' or —NR8R9, where R7' and R7" represent hydrogen or an alkyl group with 1–24 C-atoms, preferably 8–22 C atoms or alkyl-substituted alkyl groups, preferably phenyl groups having $C_1$–$C_{18}$-alkyl substituents, particularly preferably phenyl groups having $C_6$–$C_{16}$-alkyl substituents, where R8 and R9 each independently represent an alkyl group with 1–6 C atoms, or together with the nitrogen atom and possibly other hetero atoms represent a 5- or 6-membered heterocyclic ring;

wherewith, preferably,

R7' represents hydrogen or an alkyl group with 1–6 C atoms;

vinyl esters of formula (VII), in the amount of preferably 0–80 wt. %, particularly preferably 5–20 wt. %, of the total weight of the monomers M

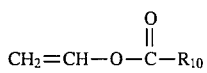

$$CH_2=CH-O-\overset{\overset{O}{\|}}{C}-R_{10} \quad \text{(VII)}$$

where R10 represents an alkyl group, optionally branched, with 1–13 C atoms; and vinylaromatics of formula (VIII), in the amount of preferably 0–60 wt. %, particularly preferably 0.5–40 wt. %, of the total weight of the monomers M

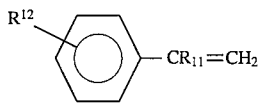

where R11 and R12 represent hydrogen or an alkyl group with 1–4 C atoms.

As a rule, the weight-percentages of the monomer components M add up to 100 wt. %. All of these monomers may be known. For certain applications, nitrogen-free comb polymers are preferred.

In addition to (meth)acrylic acid esters of formula (V) having 1–6 C atoms (particularly in the form of mixtures of such esters), compounds of formula (V) may be used in which R5 has 6–24 C atoms; wherewith such compounds of formula (V) are present in amounts of 40–100, preferably 80–100 parts by weight, based on the total weight of the monomers of formula (V). Here the alkyl groups of R5, represent an alkyl in the range 9–20 C atoms, more particularly 10–18 C atoms, with degrees of branching ranging from 25–80% or more, and may be contributed from products of, e.g., large scale manufacturing processes such as the oxo process.

Suitable materials of formula (V) are, e.g., the commercial product Lincol® of the firm Condea, esters of Dobanol® alcohols (Shell), esters of Alfol® alcohols (Condea), esters of Lorol® alcohols, esters of tallow fat alcohols, etc. Of particular interest are, e.g., esters of alcohol mixtures of isomeric isodecyl alcohols, esters of alcohol mixtures of isomeric isoundecyl alcohols, or esters of a mixture of alcohols with an average 13.2–13.8 C atoms, principally comprised of alcohols with 12–15 C atoms (Dobanol® 25 L). Other good candidates are esters of cyclic alkanols, e.g. having 5–8 ring carbon atoms, e.g. cyclopentanol, cyclohexanol, cyclooctanol, benzyl alcohol, and alkyl-substituted cyclohexanols such as 4-tert-butylcyclohexanol.

Representative examples are methyl (meth)acrylate, ethyl (meth)acrylate, butyl (meth)acrylate, ethylhexyl (meth)acrylate, octyl (meth)acrylate, dodecyl (meth)acrylate, hexadecyl (meth)acrylate, eicosyl (meth)acrylate; and compounds of formula (V) where Z represents NR7, e.g. (meth)acrylamide, N-methyl (meth)acrylamide, N,N-dimethyl (meth)acrylamide, and N-t-butyl (meth)acrylamide. Copolymers may be formed with, e.g., monomers of formula (VI) such as methyl methacrylate, 2-dimethylaminoethyl methacrylate, or butyl acrylate, as monomers M, and 2-(4-morpholinyl)ethyl methacrylate or N-dimethylaminopropyl methacrylamide, as monomers of formula (VI).

In certain proportions, e.g. up to 20 parts by weight, based on the total weight of the monomers of formula (V), R5 may also be replaced with an aromatic or cyclic group, particularly a phenyl, naphthyl, or benzyl group, which group may be substituted with, e.g., an alkyl group having 1–4 C atoms, or fluorine, or a group analogous to R6.

Representative examples are phenyl (meth)acrylate, 1-phenylethyl (meth)acrylate, benzyl (meth)acrylate, N-phenyl (meth)acrylamide, N-benzyl (meth)acrylamide, 4-hydroxyphenyl (meth)acrylate, naphthyl (meth)acrylate, 9-fluorenyl (meth)acrylate, and pentafluorophenyl (meth)acrylate. Examples of cycloalkyl (meth)acrylate compounds are: cyclopentyl-, cyclohexyl-, and cyclooctyl (meth)acrylate; 3,3,5-trimethylcyclohexyl (meth)acrylate, 3-cyclohexylpropyl (meth)acrylate, N-cyclohexyl (meth)acrylamide, 4-hydroxycyclohexyl (meth)acrylate, and 4-fluorocyclohexyl (meth)acrylate.

Examples of monomers of formula (VI) are heterocyclic vinyl compounds, particularly vinyl lactams, vinylimidazoles, vinylpyridines, and vinylcarbazoles (see Ger. OS 26 34 033). A preferred Example is N-vinyl-2-pyrrolidone.

Particular heteroatoms which may be present in the monomers of formula (VI) are nitrogen, oxygen, and sulfur. Particularly important compounds of formula (VI) are functionalized (meth)acrylate esters and (meth)acrylamides, particularly those having at least one ether bridge, and preferably being of a relatively high degree of alkoxylation.

Examples of compounds of this type are, e.g., (meth)acrylic acid esters of alkoxylated aliphatic alcohols, e.g. alkoxylated butanol, and other alkoxylated alcohols, with candidates for the underlying alcohols being, among others:

methanol, ethanol, propanol, pentanol, and isomers thereof, hexanol, and isomers thereof, cyclohexanol, methylcyclohexanol, 2-ethylhexanol, and higher aliphatic monohydric alcohols, such as isodecyl alcohol, isoundecyl alcohol, isotridecyl alcohol, fatty alcohols produced from natural raw materials, etc.

Other candidates are:

alkoxylated phenols, e.g. based on phenol, alkyl-substituted phenols (e.g. tert-butylphenol and 2,6-dimethylphenol), isomeric mixtures and technical alkylphenols (comprising, e.g., octylphenol, nonylphenol, and/or dinonylphenol), naphthol, and alkyl-substituted naphthols.

Further, addition products of ethylene oxide or propylene oxide to substituted alcohols, e.g.: furfurol, tetrahydrofurfurol, 2-methoxybutanol, 2-dimethylaminoethanol, 1-dimethylamino-2-propanol, 3-dimethylamino-1-propanol, 2-morpholinoethanol, 2-(2-pyridyl)ethanol, N-(2-hydroxyethyl)piperidine, and N-(2-hydroxyethyl)pyrrolidone.

Of special interest are alcohols which represent (statistical) addition products of ethylene oxide and propylene oxide to an alcohol such as, e.g., butanol. A preferred Example is (meth)acrylic acid esters of ethoxylated fatty alcohol mixtures, e.g. esters of $C_{16}$–$C_{18}$-fatty alcohol mixtures with degrees of ethoxylation in the range 11–50.

A suggested molecular weight range for the preferred monomers with a high degree of alkoxylation is, e.g., the range up to about 2000 Dalton. However, this is not a limitation. Depending on the degree of alkoxylation and the size of the group R2, higher molecular weights up to about 5000 Dalton may be used. The monomers of formula (V) may be present as mixtures, comprised of methacrylates of various of the above-described alkoxylated alcohols.

Also of interest are alkyl esters, substituted with at least one hydroxyl group, having 2–50 C atoms in the alkyl group, e.g., 2-hydroxyethyl (meth)acrylate, 2- and 3-hydroxypropyl (meth)acrylate, 4-hydroxybutyl (meth)acrylate, or amides such as N-(2-hydroxyethyl)methacrylamide and N-(3-hydroxy-2,2-dimethylpropyl)methacrylamide.

Further, (meth)acrylic acid esters of amino alcohols, such as diethylaminoethyl (meth)acrylate, 2-(dimethylamino) propyl (meth)acrylate, 3-dimethylamino-2,2-dimethylpropyl (meth)acrylate, 2-tert-butylaminoethyl (meth-)acrylate, 2(dimethylamino)ethoxyethyl (meth)acrylate, and corresponding amides, such as N-dimethylaminomethyl (meth)acrylamide, N-(3-dimethylamino)propyl (meth-)acrylamide, N-(1-piperidinyl)methyl (meth)acrylamide, N-(3-morpholinylpropyl) (meth)acrylamide, 2-(1-imidazolyl)ethyl (meth)acrylate, N-methacryloyl-2-pyrrolidone, etc.

Particularly interesting candidates as monomers of formula (VII) are vinyl acetate and vinyl propanoate.

Monomers of formula (VIII) which might be particularly mentioned are styrene, α-methylstyrene, and p-methylstyrene.

The preparation of the macromonomers of formula (I) from the hydroxyl-group-containing compounds of formula (II) by means of a reagent MR which transfers (meth)acryloyl groups proceeds analogously to known acylations. Thus, e.g., MR may be a (meth)acrylic acid anhydride, or a (meth)acrylic acid halide, or particularly the chloride. However, it is preferred to carry out the acylation by transesterification with (meth)acrylic acid esters of lower alcohols, e.g. the alcohols with 1–4 C atoms, with the preferred such ester being methyl (meth)acrylate. The transesterification may be acid- or base-catalyzed. It has been found to be advantageous, e.g., to carry out the transesterification with orthotitanates, e.g. isopropyl titanate, in the suggested amounts of 0.1–1 wt. %, based on the weight of the alcohol, at elevated temperature, e.g. at the boiling point of the lower (meth)acrylic acid ester which ester also serves as a solvent (see U.S. Pat. No. 5,254,632).

Of technical interest also is transesterification using a combination of a lithium compound, e.g. lithium hydroxide, and calcium oxide.

In all cases it is recommended that polymerization inhibitors be used, e.g. sterically hindered phenols such as 4-methyl-2,6-di-tert-butylphenol (see Ullmann's Encyclopedia of Industrial Chemistry, 5th Ed., Vol. A 20, pub. VCH, pp. 461–475 (1992)).

The transesterification may also be carried out with free (meth)acrylic acid by the DCC (dicyclohexylcarbodiimide) method, particularly if the terminal group B'—Q'—ROH in formula (II-A) is produced by the addition of maleic anhydride with subsequent imidification with an alkanolamine. (For methods, see Guanon, Y., and Rempp, P., *Makrom. Chem.*, 188, 2111–2119 (1987)). Various methods may be used to produce the hydroxyl-group containing compounds of formulas (II) and (II-A) from the macromonomer of formula (I). Of particular interest is direct production by hydroformylation. E.g., one may employ the reaction with a reagent of formula (III) where Q represents a thiol group and B represents an alkyl group with 2–8 C atoms, particularly an alpha,omega-thioalcohol, e.g. thioethanol, thiopropanol, or thiobutanol.

Another method of converting the compounds of formula (I) to the hydroxyl-group-containing compounds of formula (II) is to react the compound of formula (I) (ENE-reaction) with maleic anhydride, followed by imidization with an alpha,omega-aminoalcohol, e.g. ethanolamine.

Advantageously, the method may be as follows: The compound of formula (I) is reacted, without solvent, with maleic anhydride, in a molar ratio of 1:2.5, at about 200° C., under nitrogen, with stirring, for about 12 hr. Then, preferably excess maleic anhydride is distilled off under vacuum (about 20 mbar) at about 160° C.

Advantageously, the imidization of the maleic anhydride adduct with the alpha,omega-aminoalcohol, e.g. ethanolamine, is carried out in a molar ratio of 1:3, again without a solvent. The reaction mixture is thoroughly intermixed at about 100° C., and is then heated for about 3 hr at 160° C., followed by distillation-off of the excess ethanolamine at 160° C. at <5 mbar (for about 4 hr). Advantageously in this case a combination of (meth)acrylic acid and DCC is used (as reagent MR) for the acylation. Thus, for example, the esterification is carried out with the imidized maleic anhydride adduct, as a compound of formula (II-A), and the (meth)acrylic acid, in the presence of an organic base such as, e.g., 4dimethylaminopyridine and dicyclohexylcarbodiimide, in a molar ratio of 1:1.2:1.4:1.2, with addition of a polymerization inhibitor such as, e.g., 200 ppm of 4-methyl-2,6-di-tertbutylphenol (10% in a suitable inert solvent such as, e.g., dichloromethane), over a relatively long duration, e.g. 72 hours. The dicyclohexylurea which is liberated should be as insoluble as possible in the solvent, so that it can be removed by filtration. The product may be refined, e.g., using column chromatography (e.g. a kieselgel 60 column, comprising silica gel). The number average molecular weight Mn of the macromonomers of formula (IV) is in the range 500–50,000 g/mol, preferably 1,000–20,000 g/mol (determined by size exclusion chromatography (SEC) (see Ullmann's, *loc.cit.*, Vol. A20, pp. 520–533, (1992)). The inventive comb polymers can be produced by radical polymerization of the monomers M in the presence of the macromonomers of formula (IV) or (IV-A) (see Rauch-Puntigam, H. and Voelker, Th., "Acryl- und Methacrylverbindungen", pub. Springer-Verlag (1968)).

Smaller reaction mixtures may be accommodated, e.g., in a Schlenk vessel. With larger reaction mixtures one uses a reactor with a stirrer, gas feed means, and heating means. The macromonomer of formula (IV) and the monomer M of formulas (V)–(VIII) are dissolved in a suitable inert solvent L, e.g. in toluene or xylene, in the amount of about 50 wt. %. In a typical reaction mixture these monomer components are present in a ratio of 1:1 by weight. Degassing is carried out by addition of dry ice, and purging with nitrogen for about 10 minutes. Advantageously, the reaction mixture is heated to approximately the polymerization temperature, e.g. 77° C., and the initiator is added, e.g. in a 1% solution in the solvent L. Candidates for use as initiators are the known initiators, e.g., azo compounds such as azobisisobutyronitrile (AIBN), or peroxy-compounds, in the usual amounts, e.g. 0.1–1 wt. % (based on the weight of the monomers). Advantageously, additional initiator is post-added at certain intervals, e.g. after 4 hr and after 6 hr. The overall duration of the polymerization process is ordinarily on the order of 1 day.

The comb polymer KP formed has a main chain essentially comprised of alkyl (meth)acrylate of formula (V) and side chains comprised of macromonomers of formula (IV).

The macromonomers of formula (I) have been made available by virtue of various recent developments in the art. Particularly noteworthy is, e.g., the possibility of producing terminally unsaturated olefin-macromonomers by means of metallocene catalysis. Suitable starting compounds are, e.g., ethylene, propylene, or other α-olefins, and combinations thereof. Preferred is (referring to the above description of the invention)

the variant of case (2) (case 2') wherein b is 100 mol % (see Muehlhaupt, R., *Nachr. Chem. Techn. Lab.* (pub. VCH), 41., (12):1241–1351(1993)), or the variant of case 3' wherein c is 100 mol %, preferably produced by cationic polymerization of isobutylene.

As starting compounds one might mention, e.g., industrially produced macromonomers of the "reactive polyisobutylene" type, having reactive exo-double bonds. These macromonomers can be hydroformylated, to form, among other things, macroalcohols of formula (II). The molecular weights are preferably in the range 1000–5000. Also of interest are propene macromonomers with a terminal double bond; suggested number average molecular weights Mn are in the order of about 800–5000 g/mol.

The inventive comb polymers are particularly suited for use in tribology, or as lubricating oil additives as viscosity index improvers with particularly desirable rheological properties, as dispersants of the "ashless" type, etc.

BRIEF DESCRIPTION OF THE DRAWING

FIG. 1a represents the method.
FIG. 1b represents the evaluation.

DESCRIPTION OF THE PREFERRED EMBODIMENT

Figure 1A:
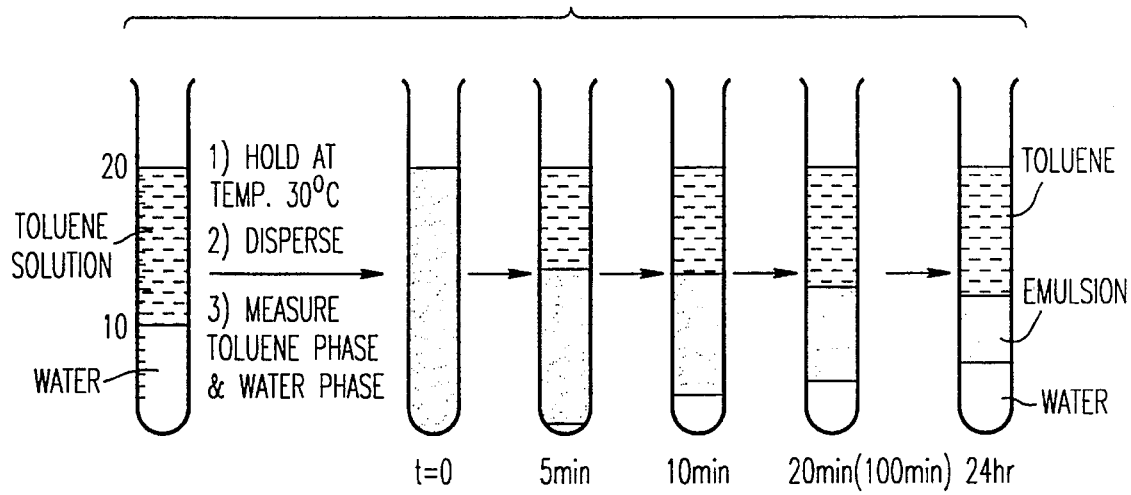
FIGS. 1a and 1b represent a toluene/water dispersion test.

Having generally described this invention, a further understanding can be obtained by reference to certain specific examples which are provided herein for purposes of illustration only and are not intended to be limiting unless otherwise specified.

EXAMPLES

In the Examples, macromonomers and comb polymers based on macroalcohols prepared from polyisobutylene (PIB) and atactic polypropylene (PP) are described. The effectiveness of comb polymers as dispersants is demonstrated in laboratory dispersion tests. The advantages of non-dispersant comb polymer viscosity index improvers (hereinafter, V.I.-improvers) in comparison to conventional linear PAMA V.I.-improvers are shown. The key benefit is an improved relation between thickening and shear stability.

Materials Used

The macroalcohols are products having primary OH groups; these products are prepared by hydroformylation and subsequent hydrogenation of terminally unsaturated PIB or PP.

Table of materials:
KEY to Table:
(a) Name;
(b) Molecular weight Mn (by vapor pressure osmosis);
(c) Thickening action, KV100 test (ASTM D 445), at 10 wt. % in mineral-oil-based 150N measuring oil.
(a) PIB-OH-I; (b) 2230; (c) 9.42 centistoke (cSt). (a) PIB-OH-II; (b) 2950; (c) 10.27 cSt. (a) PP-OH; (b) 1440; (c) 8.13 cSt.

Additional Materials Used

100N=100N-oil.
Tempol=4-hydroxy-2,2,6,6-tetramethylpiperidinoxyl.
HME=hydroquinone monomethyl ether.
LiOMe=lithium methanolate.
MMA=methyl methacrylate.
DMA=i-decyl methacrylate.
AMA-1=methacrylate of a mixture of $C_{11}$–$C_{16}$-alcohols.
AMA-2=methacrylate of tallow fatty alcohols.
BMA=butyl methacrylate.
MEMA=2-N-morpholinoethyl methacrylate.
VP=N-vinylpyrrolidone.
S=styrene.
IN-1=tert-butyl perpivalate.
IN-2=tert-butyl per-2-ethylhexanoate.
IN-3=tert-butyl per-isononanoate.

Production of the Macromonomers by Transesterification of the Macroalcohols PIB-OH and PP-OH Example 1

Production of the macromonomer PIB-MM-I (50% in 100N)

Apparatus: 4-liter three-necked flask with an electrical heating mantle, sickle-shaped stirrer, internal thermometer, air inlet, and distillation head with packed column.

900 g PIB-OH-I was dissolved in 900 g 100N-oil by stirring 12 hr at 100° C. After cooling, 1063 g MMA, 85 mg Tempol, and 350 mg HME were added. After heating to reflux while air was passed through the mixture, about 160 g MMA was distilled-off to effect azeotropic drying. After cooling to about 95° C. and addition of 1.7 q LiOMe, the mixture was refluxed for 3 hours, following which 300 g MMA was distilled off along with a small amount of methanol. As a further refinement step, the excess MMA was removed in a rotary vacuum evaporator at 50° C. and 1 mbar.

Yield: 1800 g oil solution of the macromonomer PIB-MM-I.

Example 2

Production of the macromonomer PIB-MM-II (50% in 100N)

The apparatus and procedure were analogous to Example 1, but 900 g of the macroalcohol PIB-OH-II was used instead of PIB-OH-I.

Yield: 1800 g oil solution of the macromonomer PIB-MM-II.

Example 3

Production of the macromonomer PP-MM (50% in 100N)

The apparatus and procedure were analogous to Example 1, but 900 g of the macroalcohol PP-OH was used.

Yield: 1800 g oil solution of the macromonomer PP-MM.

Production of Dispersant Comb Polymers

Example 4

Production of a dispersant comb polymer V.I.-improver KP-4

Apparatus: 200-mL three-necked flask with oil heating bath, sickle-shaped stirrer, internal thermometer, and $N_2$ pass-over.

The following were charged to the vessel:
13.2 g MEMA
105.6 g PIB-MM-II
1.2 g 100N After heating to 75° C. under nitrogen, a mixture of 0.1 g IN-1 and 0.1 g IN-2 was added and the temperature of the oil bath was adjusted to 95° C. An additional dose of 0.13 g IN-2 was added 4 hours following the first initiator addition, and again after another 2 hr. The temperature was maintained at 95° C. for 6 hours after the last initiator dosing.

Yield: 120 g 55% oil solution of the dispersant comb polymer KP-4.

Example 5

Production of a dispersant comb polymer
V.I.-improver KP-5

The following were charged to the apparatus of Example 4:

9.9 g DMA
3.3 g MEMA
105.6 g PIB-MM-I
1.2 g 100N

After heating to 75° C. under nitrogen, a mixture of 0.2 g IN-1 and 0.2 g IN-3 was added and the temperature of the oil bath was adjusted to 105° C. An additional dose of 0.13 g IN-3 was added 4 hours following the first initiator addition. The temperature was maintained at 105° C. for 6 hours thereafter.

Yield: 120 g 55% oil solution of the dispersant comb polymer KP-5.

Example 6

Production of a dispersant comb polymer
V.I.-improver KP-6

The following were charged to the apparatus of Example 4:

9.9 gBMA
3.3 g MEMA
105.6 g PIB-MM-I
1.2 g 100N

The procedure was otherwise as in Example 5.

Yield: 120 g 55% oil solution of the dispersant comb polymer KP-6.

Example 7

Production of a dispersant comb polymer
V.I.-improver KP-7

The following were charged to the apparatus of Example 4:

36.3 g AMA-1
3.3 g MEMA
52.8 g PIB-MM-I
27.6 g 100N

After heating to 75° C. under nitrogen, a mixture of 0.2 g IN-1 and 0.2 g IN-3 was added and the temperature of the oil bath was adjusted to 105° C. An additional dose of 0.13 g IN-3 was added 4 hours following the first initiator addition. The temperature was maintained at 105° C. for 6 hr thereafter.

Yield: 120 g 55% oil solution of the dispersant comb polymer KP-7.

Example 8

Production of a dispersant comb polymer
V.I.-improver KP-8

The following were charged to the apparatus of Example 4:

9.9g AMA-1
3.3 g MEMA
105.6 g PIB-MM-I
1.2 g 100N

After heating to 75° C. under nitrogen, a mixture of 0.10 g IN-1 and 0.10 g IN-3 was added and the temperature of the oil bath was adjusted to 105° C. An additional dose of 0.13 g IN-3 was added 4 hours following the first initiator addition, and again after another 2 hours. The temperature was maintained at 95° C. for 6 hours after the last initiator dosing.

Yield: 120 g 55% oil solution of the dispersant comb polymer KP-8.

Example 9

Production of a dispersant comb polymer
V.I.-improver KP-9

The following were charged to the apparatus of Example 4:

6.6g AMA-1
3.3 g VP
3.3 g S
105.6 g PIB-MM-I
1.2 g 100N

After heating to 75° C. under nitrogen, a mixture of 0.2 g IN-1 and 0.2 g IN-3 was added and the temperature of the oil bath was adjusted to 105° C. An additional dose of 0.13 g IN-3 was added 4 hours following the first initiator addition, and again after another 2 hours. The temperature was maintained at 95° C. for 6 hours after the last initiator dosing.

Yield: 120 g 55% oil solution of the dispersant comb polymer KP-9.

Example 10

Production of a dispersant comb polymer
V.I.-improver KP-10

The following were charged to the apparatus of Example 4:

9.9 g AMA-2
3.3 g MEMA
105.6 g PIB-MM-II
1.2 g 100N

The procedure was otherwise as in Example 9.

Yield: 120 g 55% oil solution of the dispersant comb polymer KP-10.

Example 11

Production of a dispersant comb polymer
V.I.-improver KP-11

The following were charged to the apparatus of Example 4:

6.6 g AMA-1

6.6 g MEMA
105.6 g PIB-MM-II
1.2 g 100N

After heating to 75° C. under nitrogen, a mixture of 0.2 g IN-1 and 0.2 g IN-2 was added and the temperature of the oil bath was adjusted to 95° C. An additional dose of 0.13 g IN-2 was added 4 hours following the first initiator addition, and again after another 2 hours. The temperature was maintained at 95° C. for 6 hours after the last initiator dosing.

Yield: 120 g 55% oil solution of the dispersant comb polymer KP-11.

Example 12

Production of a dispersant comb polymer V.I.-improver KP-12

The following were charged to the apparatus of Example 4:
9.9 g AMA-1
1.65 g MEMA
1.65 g VP
105.6 g PIB-MM-I
1.2 g 100N The procedure was otherwise as in Example 9.

Yield: 120 g 55% oil solution of the dispersant comb polymer KP-12.

Example 13

Production of a dispersant comb polymer V.I.-improver KP-13

The following were charged to the apparatus of Example 4:
9.9 g AMA-2
3.3 g MEMA
105.6 g PP-MM
1.2 g 100N The procedure was otherwise as in Example 9.

Yield: 120 g 55% oil solution of the dispersant comb polymer KP-13.

Example 14

Production of a dispersant comb polymer improver KP-14

The following were charged to the apparatus of Example 4:
9.9g AMA-1
3.3 g MEMA
105.6 g PP-MM
1.2 g 100N The procedure was otherwise as in Example 11.

Yield: 120 g 55% oil solution of the dispersant comb polymer KP-14.

Example 15

Production of a comb polymer V.I.-improver KP-15

The following were charged to the apparatus of Example 4:
27.9 g AMA-1
32.1 g MEMA
80.0 g PIB-MM-II
41.8 g 100N After heating to 90° C. under nitrogen, 0.5 g IN-1 was added and the temperature of the oil bath was adjusted to 90° C. An additional dose of 0.2 g IN-1 was added 4.5 hours following the first initiator addition, and again after another 5 hours.

Yield: 181.8 g 55% oil solution of the comb polymer V.I.-improver KP-15.

Example 16

Production of a comb polymer V.I.-improver KP-16

The following were charged to the apparatus of Example 4:
26.4 g AMA-1
26.4 g S
26.4 g PIB-MM-II
14.8 g 100N After heating to 75° C. under nitrogen, a mixture of 0.13 g IN-1 and 0.13 g IN-2 was added and the temperature of the oil bath was adjusted to 95° C. An additional dose of 0.13 g IN-2 was added 4 hr following the first initiator addition, and again after another 2 hours. The temperature was maintained at 95° C. for 6 hours after the last initiator dosing. After termination of the polymerization, the mixture was diluted with 26 g 100N-oil.

Yield: 120 g 55% oil solution of the comb polymer V.I.-improver KP-16.

Example 17

Production of a comb polymer V.I.-improver KP-17

The following were charged to the apparatus of Example 4:
26.4 g AMA-1
13.2 g S
52.8 g PIB-MM-II
1.6 g 100N The procedure was otherwise as in Example 16.

Yield: 120 g 55% oil solution of the comb polymer V.I.-improver KP-17.

Example 18

Production of a comb polymer V.I.-improver KP-18:

The following were charged to the apparatus of Example 4:
16.5 g S
99.0 g PIB-MM-II
4.5 g 100N After heating to 75° C. under nitrogen, a mixture of 0.13 g IN-1 and 0.13 g IN-2 was added and the temperature of the oil bath was adjusted to 95° C. An additional dose of 0.13 g IN-2 was added 4 hours following the first initiator addition, and again after another 2 hours. The temperature was maintained at 95° C. for 6 hours after the last initiator dosing.

Yield: 120 g 55% oil solution of the comb polymer V.I.-improver KP-18.

Example 19

Production of a comb polymer V.I.-improver KP-19.

The following were charged to the apparatus of Example 4:

26.4 g S
79.2 g PP-MM
14.4 g 100N

After heating to 75° C. under nitrogen, a mixture of 0.13 g IN-1 and 0.13 g IN-2 was added and the temperature of the oil bath was adjusted to 95° C. An additional dose of 0.13 g IN-2 was added 4 hr following the first initiator addition, and again after another 2 hours. The temperature was maintained at 95° C. for 6 hours after the last initiator dosing.

Yield: 120 g 55% oil solution of the comb polymer V.I.-improver KP-19.

Example 20

Production of a comb polymer V.I.-improver KP-20

The following were charged to the apparatus of Example 4:

13.2 g AMA-1
26.4 g S
52.8 g PIB-MM-II
27.6 g 100N

The procedure was otherwise as in Example 19.

Yield: 120 g 55% oil solution of the comb polymer V.I.-improver KP-20.

Example 21

Production of a comb polymer V.I.-improver KP-21

The following were charged to the apparatus of Example 4:

30.0 g AMA-1
30.0 g S
80.0 g PIB-MM-II
41.7 g 100N

After heating to 90° C. under nitrogen, 0.5 g IN-1 was added and the temperature of the oil bath was adjusted to 90° C. An additional dose of 0.2 g IN-1 was added 4.5 hours following the first initiator addition, and again after another 5 hours.

Yield: 181.8 g 55% oil solution of the comb polymer V.I.-improver KP-21.

Example 22

Production of a comb polymer V.I.-improver KP-22

The following were charged to the apparatus of Example 4:

50.0 g BMA
100.0 g PP-MM
31.8 g 100N

After heating to 90° C. under nitrogen, 0.7 g IN-1 was added and the temperature of the oil bath was adjusted to 90° C. An additional dose of 0.2 g IN-1 was added 4.5 hours following the first initiator addition, and again after another 5 hours.

Yield: 181.8 g 55% oil solution of the comb polymer V.I.-improver KP-22.

Example 23

Production of a comb ple 18olymer V.I.-improver KP-23

The following were charged to the apparatus of Example 4:

50.0 g BMA
100.0 g PP-MM
50.0 g 100N

After heating to 90° C. under nitrogen, 0.9 g IN-1 was added and the temperature of the oil bath was adjusted to 90° C. An additional dose of 0.2 g IN-1 was added 4.5 hr following the first initiator addition, and again after another 5 hr.

Yield: 200.0 g 55% oil solution of the comb polymer V.I.-improver KP-23.

Characterization of the Comb Polymer V.I.-Improvers

The dispersive action of the comb polymer V.I.-improvers was studied with laboratory tests. Using a toluene/water emulsifier test (T/W test) the interfacial activity of the dispersant V.I.-improvers can be characterized, as the ability to stabilize water-in-oil emulsions and/or generally the ability to disperse polar substances in a nonpolar organic medium. The T/W test serves as a model of the dispersion of polar sludges in motor oil.

Using a carbon black spot test, the ability to disperse finely dispersed carbon black in oil was tested. This serves as a model of carbon-particle thickening of oils in diesel engines.

Toluene/Water Emulsification Test

The additive to be tested for its emulsifying capability was dissolved in toluene (to which 20 ppm Oracet Blue B had been added), at a polymer concentration of 1 wt. %. 7 mL distilled water and 13 mL of the 1% toluene solution were charged successively to a 20 mL graduated Schiff test tube, and the mixture was held 15 min in a water bath at 30° C. A uniform emulsion was produced by vigorous shaking of the test tube, and the sample was re-immersed in the water bath. The separation of the emulsion into toluene-, emulsion-, and water layers was observed over the ensuing 24-hr period, wherewith, using the graduations, the interfaces (toluene/emulsion and emulsion/water) were read at times 5 min, 10 min, 100 min, and 24 hr (see FIG. 1a).

Evaluation

Figure 1B:
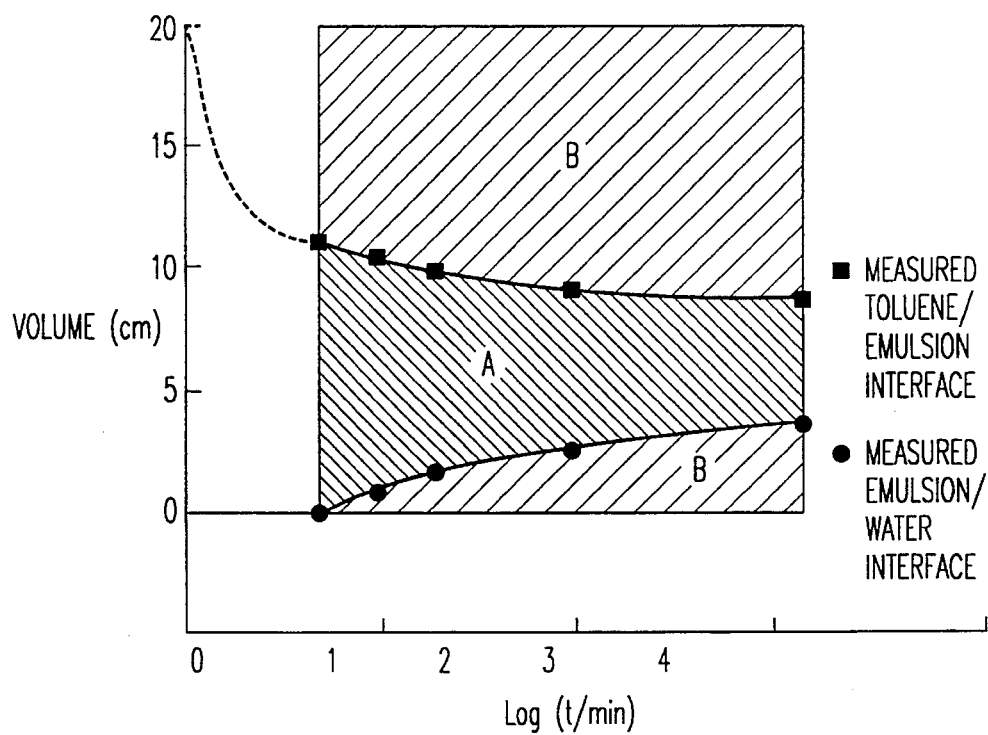

The emulsifying capability was quantified in units of percent according to the scheme presented in FIG. 1b, wherein a characterizing percentage of the emulsion present over the observation times from 5 min to 24 hr was obtained by determining the ratio of the area A to the total area A+B, expressed as a percentage. Polymers with good dispersant capability give values greater than 20%.

Carbon Black Spot Test

Two stock solutions comprised of the additive to be tested mixed into 150N-oil (Enerpar (R) 11) were prepared:

Stock Solution I, with 0.375% content of the polymer, and

Stock Solution II with 0.75%.
Two dispersion solutions were prepared from each Stock Solution (testing in duplicate). 1.5 g carbon black ("Degussa Spezialschwarz 4", a flame-produced carbon black) and 50 g Stock Solution were charged to a 150 mL glass beaker in each case, and were stirred with an "Ultra-Turrax Intensiv" stirrer 30 min at 9000 rpm. Then 20 uL of each dispersion solution was delivered as a spot onto "Durieux 122" filter paper. After 48 hr of uniform storage at 30° C., the spots were evaluated. The evaluation was expressed as a percentage, as follows:

carbon black spot diameter/oil spot diameter—100, for each spot, where the oil spot diameter is the diameter of the oil spot surrounding the carbon black spot. The overall evaluation of the spot test was expressed as the sum of the four percentage values. Products having poor carbon black dispersivity give overall values of about 70% or lower, whereas products having good carbon black dispersivity give ≧130%.

Effectiveness of the Dispersive Comb Polymer V.I.-Improvers

Table 1 presents the chemical compositions and viscosity data for dispersing comb polymer V.I.-improving agents KP-4 through KP-14, and their evaluations in the laboratory dispersion tests. All products showed good dispersivity in the carbon black spot test, thus capability to disperse finely divided carbon. Accordingly, these dispersive comb polymers are expected to provide good management of carbon particle thickening in diesel engine oils.

The dispersing comb polymers KP-4, KP-8, KP-10, and KP-11 also showed good interfacial activity in the T/W test, and accordingly are expected to be well suited for dispersing polar motor oil sludges.

Effectiveness of the Non-Dispersive Comb Polymer V.I.-Improvers

Table 2 gives the chemical composition, viscosity data, and shear stabilities of comb polymer V.I.-improvers KP-15 through KP-23, as well as comparison data for currently used conventional V.I.-improvers based on linear PMMA. At equal thickening action KV100, the comb polymer V.I.-improvers showed superior shear stability, i.e. a lower permanent shear stability index, PSSI [(DIN 51382)), than for the linear PAMA. In comparisons of products having similar PSSIS, the comb polymer V.I.-improvers show higher thickening action, which leads to savings in the amount of polymer used, compared to linear PAMA V.I.-improvers. Moreover, in some cases the comb polymer V.I.-improvers show substantially higher viscosity indices (compare KP-22 to PAMA V.I.-improvers I, II, and III).

TABLE 1

Dispersive Comb Polymer Viscosity Index Improvers

| Example | Polymer Composition wt % of Monomers | Polymer content of Additives (wt %) | KV40*) (mm²/s) | KV100*) (mm²/s) | VI B# | Toluene/ Water-Test | Carbon Black Spot-Test |
|---|---|---|---|---|---|---|---|
| KP-4 | (PIBMM-II)—MEMA 80—20 | 55 | 62,8 | 9,88 | 142 | 56% | 142% |
| KP-5 | (PIBMM-I)—DNA—MEMA 80—15—4 | 55 | 71,9 | 11,17 | 147 | 1% | 140% |
| KP-6 | (PIBMM-I)—BMA—MEMA 80—15—5 | 55 | 61,4 | 10,10 | 151 | 11% | 135% |
| KP-7 | (PIBMM-I)—(AMA-1)—MEMA 40—55—5 | 55 | 108,8 | 11,97 | 99 | 0% | 138% |
| KP-8 | (PIBMM-I)—(AMA-1)—MEMA 80—15—5 | 55 | 104,5 | 16,12 | 166 | 19% | 148% |
| KP-9 | (PIBMM-I)—(AMA-1)—S—VP 80—10—5—5 | 55 | 92,5 | 13,70 | 150 | 3% | 157% |
| KP-10 | (PIBMM-II)—(AMA-2)—MEMA 80—15—5 | 55 | 98,4 | 14,98 | 160 | 31% | 152% |
| KP-11 | (PIBMM-II)—(AMA-1)—MEMA 80—10—10 | 55 | 97,5 | 15,69 | 172 | 24% | 156% |
| KP-12 | (PIBMM-I)—(AMA-1)—VP—MEMA 80—15—2,5—2,5 | 55 | 70,0 | 10,32 | 133 | 8% | 164% |
| KP-13 | (PPMM)—(AMA-2)—MEMA 80—15—5 | 55 | 120,0 | 18,04 | 168 | 1% | 148% |
| KP-14 | (PPMM)—(AMA-1)—MEMA 80—15—5 | 55 | 116,2 | 17,36 | 164 | 6% | 161% |

Note: Viscosity data columns are for 5 wt % polymer solution in 150 N measuring oil; last two columns are Evaluation in Dispersion Test.

*)Dynamic viscosity (KV)
)Viscosity index VI B: DIN ISO 2909

TABLE 2

| | | | Non-dispersive comp polymer V.I.-improver | | | | |
|---|---|---|---|---|---|---|---|
| | | | Viscosity data for 5 wt % polymer solution in 150 N measuring oil | | | (PSSI)≠ | |
| Example | Polymer Composition wt % of Monomers | Polymer content of Additives (wt %) | KV40*) (mm²/s) | KV100*) (mm²/s) | VI B#) | DIN 51382 (30 Cycles) | ASTM-D93 Ref. B |
| KP-15 | (PIBMM-II)—(AMA-1)—MEMA 40—27,9—32,1 | 55 | 66,2 | 12,56 | 192 | 12,4 | |
| KP-16 | (PIBMM-II)—(AMA-1)—S 20—40—40 | 55 | 70,9 | 11,90 | 164 | 11,3 | |
| KP-17 | (PIBMM-II)—(AMA-1)—S 40—40—20 | 55 | 86,4 | 13,79 | 163 | 18,2 | |
| KP-18 | (PIBMM-II)—S 75—25 | 55 | 68,7 | 10,43 | 139 | 3,5 | 15,8 |
| KP-19 | (PPMM)—S 60—40 | 55 | 73,6 | 12,57 | 171 | 13,4 | 29,2 |
| KP-20 | (PIBMM-II)—(AMA-1)—S 40—20—40 | 55 | 62,7 | 10,51 | 157 | | 15,5 |
| KP-21 | (PIBMM-II)—(AMA-1)—S 40—30—30 | 55 | 78,4 | 12,54 | 159 | 10,2 | 29,2 |
| KP-22 | (PPMM)—BNA 50—50 | 55 | 75,9 | 15,83 | 223 | 24,9 | |
| KP-23 | (PPMM)—BMA 50—50 | 50 | 66,6 | 12,87 | 197 | 16,6 | |
| Comparative Examples: Conventional Linear PAMA-VI-Improvers | | | | | | | |
| I | | | 70,0 | 12,87 | 187 | 24 | 45 |
| II | | | 64,0 | 11,55 | 177 | 14 | 37 |
| III | | | | | | 6 | 28 |

≠PSSI = permanent shear stability index, DIN 51382; with Bosch 30 pump cycles, ASTM-D93 Ref. B; ultrasound method
*)Dynamic Viscosity: ASTM D 445
)Viscosity Index VI B: DIN ISO 2909

What is claimed as new and is desired to be secured by Letters Patent of the United States is:

1. Comb polymer KP, produced from at least one macromonomer of formula I $$X-(CH_2-CH_2)_a-(CH_2-CH)_b-(CH_2-C)_c-B \quad (I)$$
$$\phantom{X-(CH_2-CH_2)_a-(CH_2-CH)_b-(CH_2-}\overset{|}{R_1}\phantom{)_b-(CH_2-}\overset{|}{R_2}\phantom{-C}\overset{|}{R_3}$$

comprising monomeric units $$(-CH_2-CH_2-), \ -CH_2-\overset{R_1}{\underset{|}{CH}}-), \text{ and } (-CH_2-\overset{R_2}{\underset{|}{\underset{R_3}{C}}}-),$$

where

X represents a group which is contributed from an initiator system, said group being an alkyl group with 1–50 C atoms;

R1 represents an alkyl group with 1–18 C atoms,

R2 and R3 each represent an alkyl group with 1–8 C atoms; and

B represents a terminal alkene group having between 2 and 12 C atoms;

with the following provisions:

(1) If the parameter c represents a molar percentage of greater than 0 mol %, the parameter a represents a molar percentage of zero mol % of the monomers in the macromonomer of formula (I);

(2) the sum of the parameters (a+b) equals 100 mol % of said monomeric units of said macromonomer of formula (I), and a is at most 80 mol %, or (3) the sum of b and c equals 100 mol % of said monomeric units of said macromonomer of formula (I); and (4) if a is zero, R1 becomes R1', wherein said R1' is an alkyl group with 2–18 C atoms;

wherewith the compound of formula (I) is converted, by a known method, to a compound of formula (II) said compound of formula (II) contains an active hydrogen substituent in the terminal position:

$$X-(CH_2-CH_2)_a-(CH_2-CH_2)_b-(CH_2-\overset{R_2}{\underset{|}{\underset{R_3}{C}}})_c-A-OH \quad (II)$$

where

X, R1, R2, R3, a, b, and c are as defined above, and

A represents the group B modified by the introduction of an active hydrogen function;

wherewith said compound of formula (II) is further acylated to a macromonomer of formula (IV) by a reagent MR which introduces a (meth)acryloyl group:

$$X-(CH_2-CH_2)_a-(CH_2-CH)_b-(CH-\overset{R_2}{\underset{|}{\underset{R_3}{C}}})_c-A-O-\overset{O}{\overset{||}{C}}-\overset{R_4}{\underset{|}{C}}=CH_2 \quad (IV)$$

where

X, R1, R2, R3, A, a, b, and c are as defined above, and

R4 represents hydrogen or methyl; and the macromonomers of formula (IV) thus obtained are converted to the comb polymer KP by radical polymerization with a monomer m selected from the group consisting of:

(meth)acrylic acid of a $C_1$–$C_{28}$-alkanol, functionalized, radically polymerizable monomer, vinyl ester of a fatty acid, and vinylaromatic monomer.

2. The comb copolymer KP of claim 1, wherein said R1 group is an alkyl group with 1–10 C atoms.

3. The comb copolymer KP of claim 1, wherein said R1 group is an alkyl group with 1–4 C atoms.

4. The comb polymer KP according to claim 1, produced starting from a macromonomer of formula (I), said macromonomer being reacted with a hydroxyl-group-transferring reagent of formula (III)

$$Q\text{—}R\text{—}OH \quad \text{(III)}$$

where

Q is a function which adds to the double bond in B in formula (I), and

R is a distance-maintaining inert organic group with at least 2 C atoms;

resulting in compounds of formula (II-A)

$$X\text{—}(CH_2\text{—}CH_2)_a\text{—}(CH_2\text{—}CH)_b\text{—}(CH\text{—}\underset{R_3}{\overset{R_2}{C}})_c\text{—}B'\text{—}Q'\text{—}R\text{—}OH \quad \text{(II-A)}$$

with $R_1$ on the $(CH_2\text{—}CH)_b$ unit where

X, R1, R2, R3, a, b, and c are as defined above, and

—B'—Q'— is a moiety formed by addition of Q to B across the double bond;

and said compound of formula II-A is acylated to form a macromonomer of formula IV-A by a reagent MR, said reagent MR introducing a (meth)acryloyl group:

$$X\text{—}(CH_2\text{—}CH_2)_a\text{—}(CH_2\text{—}CH)_b\text{—}(CH\text{—}\underset{R_3}{\overset{R_2}{C}})_c\text{—}B'\text{—}Q'\text{—}R\text{—}O\text{—}\underset{\underset{CH_2}{\overset{|}{C}\text{—}R_4}}{\overset{O}{\overset{\|}{C}}}$$

where

X, R1, R2, R3, R4, a, b, c, B', Q', and R are as defined above;

and, wherein said macromonomer of formula (IV) thus obtained is converted to the comb polymers KP by radical polymerization with a monomer M selected from the group consisting of:

(meth)acrylic acid of a $C_1$–$C_{28}$-alkanol, functionalized monomer, vinyl ester of a fatty acid and vinylaromatic monomer, such as styrene or $C_1$–$C_4$-alkylstyrene.

5. A comb polymer prepared by copolymerizing at least one monomer (1) and at least one macromonomer (2), wherein:

monomer (1) is selected from the group consisting of (1) (a) a compound of formula (V)

$$CH_2\text{=}\underset{R_4'}{\overset{}{C}}\text{—}\overset{O}{\overset{\|}{C}}\text{—}ZR_5 \quad \text{(V)}$$

wherein $R_4'$ is hydrogen or methyl, $R_5$ is an alkyl group with 1–24 carbon atoms and Z is oxygen or $NR_7$ where $R_7$ is hydrogen or an alkyl group with 1–6 carbon atoms;

(1) (b) a compound of formula (VI)

$$CH_2\text{=}\underset{R_4''}{\overset{}{C}}\text{—}Bs \quad \text{(VI)}$$

wherein $R_4''$ is hydrogen or methyl and Bs is a heterocyclic 5-membered or 6-membered ring or a group —CO—Z'—V—$R_6$ where Z' is oxygen or $NR_7'$, V is a hydrocarbon bridge having 2–50 carbon atoms or said hydrocarbon bridge interrupted by at least one oxygen bridge, $R_6$ is $OR_7'$ or $NR_8R_9$ where $R_7'$ is hydrogen, an alkyl group with 1–24 carbon atoms or a phenyl group having a $C_{1\text{-}18}$ alkyl substituent and $R_8$ and $R_9$ are independently $C_{1\text{-}6}$ alkyl or $R_8$ and $R_9$ together with the nitrogen atom to which they are attached form a 5-membered or 6-membered ring;

(1) (c) a compound of formula (VII)

$$CH_2\text{=}CH\text{—}O\text{—}\overset{O}{\overset{\|}{C}}\text{—}R_{10} \quad \text{(VII)}$$

wherein $R_{10}$ is an alkyl group with 1–13 carbon atoms; and (1) (d) a compound of formula (VIII)

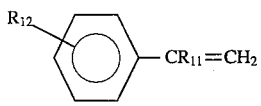

wherein $R_{11}$ and $R_{12}$ are hydrogen or an alkyl group with 1–4 carbon atoms; and monomer (2) has formula (IV)

$$X\text{—}(CH_2\text{—}CH_2)_a\text{—}(CH_2\text{—}CH)_b\text{—}(CH\text{—}\underset{R_3}{\overset{R_2}{C}})_c\text{—}A\text{—}O\text{—}\overset{O}{\overset{\|}{C}}\text{—}\underset{R_4}{\overset{}{C}}\text{=}CH_2 \quad \text{(IV)}$$

wherein X is an alkyl group with 1–50 carbon atoms, $R_1$ is an alkyl group with 1–18 carbon atoms, $R_2$ and $R_3$ are each an alkyl group with 1–8 carbon atoms, A is a group having 2–28 carbon atoms, with the following provisos:

(a) if parameter c is a molar percentage greater than 0 mol %, the parameter a is a molar percentage of 0 mol % of monomers in said macromonomer (2), (b) the sum (a+b) equals 100 mol % of monomeric units of said macromonomer (2), and a is at most 80 mol %, or (c) the sum (b+c) equals 100 mol % of monomers in said macromonomer (2), and (d) if a is zero, $R_1$ is $R_1'$, wherein $R_1'$ is an alkyl group with 2–18 carbon atoms.

6. The polymer of claim 5, wherein monomer (1) comprises 60–100 wt.% of monomer (1) (a).

7. The polymer of claim 5, wherein monomer (1) comprises 0.5–50 wt. % of monomer (1) (b).

8. The polymer of claim 5, wherein monomer (1) comprises 5–20 wt. % of monomer (1) (c).

9. The polymer of claim 5, wherein monomer (1) comprises 0.5–40 wt. % of monomer (1) (d).

10. The polymer of claim 5, wherein monomer (1) (b) is a (meth)acrylic acid ester of a $C_{16}$–$C_{18}$-fatty alcohol mixture having a degree of ethoxylation in the range 11–50.

11. The polymer of claim 5, wherein monomer (1) (c) is vinyl acetate or vinyl propionate.

12. The polymer of claim 5, wherein monomer (1) (d) is styrene, α-methylstyrene or p-methylstyrene.

13. The polymer of claim 5, wherein a=c=0 mol % and b=100 mol %.

14. The polymer of claim 13, wherein $R_1$ is methyl.

15. The polymer of claim 5, wherein a=b=0 mol % and c=100 mol %.

16. The polymer of claim 15, wherein $R_2$ and $R_3$ are methyl.

\* \* \* \* \*